United States Patent
Branson et al.

(10) Patent No.: US 10,013,198 B2
(45) Date of Patent: *Jul. 3, 2018

(54) LIMITING MEMORY CONSUMPTION IN A DISTRIBUTED ENVIRONMENT AT A GROUP LEVEL

(71) Applicant: International Business Machines Corporation, Armonk, NY (US)

(72) Inventors: Michael J. Branson, Rochester, MN (US); Jay S. Bryant, Rochester, MN (US); James E. Carey, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 136 days.

This patent is subject to a terminal disclaimer.

(21) Appl. No.: 14/834,225

(22) Filed: Aug. 24, 2015

(65) Prior Publication Data

US 2017/0060464 A1     Mar. 2, 2017

(51) Int. Cl.
*G06F 3/00* (2006.01)
*G06F 3/06* (2006.01)
*G06F 9/50* (2006.01)

(52) U.S. Cl.
CPC ............ *G06F 3/0637* (2013.01); *G06F 3/067* (2013.01); *G06F 3/0653* (2013.01); *G06F 9/50* (2013.01)

(58) Field of Classification Search
None
See application file for complete search history.

(56) References Cited

U.S. PATENT DOCUMENTS

| 8,886,866 | B2 | 11/2014 | Arcese et al. | |
|---|---|---|---|---|
| 2011/0239048 | A1* | 9/2011 | Andrade | G06F 11/3616 714/35 |
| 2012/0324196 | A1 | 12/2012 | Maillet et al. | |
| 2014/0215184 | A1 | 7/2014 | Branson et al. | |
| 2014/0237134 | A1* | 8/2014 | Branson | G06F 17/30442 709/231 |
| 2015/0081978 | A1* | 3/2015 | Daly | G06F 12/0871 711/133 |

OTHER PUBLICATIONS

International Business Machines Corporation, "List of IBM Patents or Patent Applications Treated as Related," Aug. 27, 2015, 2 pages.

(Continued)

*Primary Examiner* — David Yi
*Assistant Examiner* — Craig S Goldschmidt
(74) *Attorney, Agent, or Firm* — Gero G. McClellan

(57) ABSTRACT

Techniques are disclosed for memory management in a streams processing environment. Certain aspects of the present disclosure provide a method generally including monitoring, via a streams manager for a distributed application, an amount of memory used by a group of executing processes, and for each group, comparing the amount of memory used by the group against a memory threshold, and determining whether the memory used by the group exceeds a first threshold, and reducing memory usage by the group when the memory used by the group exceeds the first threshold.

19 Claims, 7 Drawing Sheets

(56) References Cited

OTHER PUBLICATIONS

Oracle, "Database Performance Tuning Guide", "https://docs.oracle.com/cd/B19306_01/server.102/b14211/memory.htm#g77696", 2015.
Brigham Young University, Fulton Supercomputing Lab, "How Do I Limit the Amount of Memory That My Program Uses?"; "https://marylou.byu.edu/wiki/index.php?page=How+do+I+limit+the+amount+of+memory+that+my+program+uses%3F", 2011.

* cited by examiner

LIMITING MEMORY CONSUMPTION IN A DISTRIBUTED ENVIRONMENT AT A GROUP LEVEL

BACKGROUND

Embodiments presented herein generally relate to computer software, and more specifically, to computer software to limit memory use at an operators grouping level in distributed computing environments.

Distributed computing systems, including stream computing applications, may contain operators that may grow in size as the data itself may dictate resource consumption as data structures containing the data grow in size. For example, applications designed for a particular sized average data size, may suddenly receive very large amounts of data. This spike in data may result in a commensurate spike in resource consumption, which could impact other running operations.

SUMMARY

One embodiment presented herein describes a method. The method generally includes monitoring, via a streams manager for a distributed application, an amount of memory used by a group of executing processes, and for each group, comparing the amount of memory used by the group against a memory threshold, and determining whether the memory used by the group exceeds a first threshold, and reducing memory usage by the group when the memory used by the group exceeds the first threshold Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

DETAILED DESCRIPTION

Embodiments presented herein describe techniques for limiting memory consumption in a distributed environment at a group level. In one embodiment, a distributed application executes in a computing cluster in a stream processing environment. Processing elements (PEs) of the distributed application execute in cluster nodes and retrieve streams of input in data units called "tuples" which provide a list of input values. Each PE includes one or more operators that process the incoming tuples and output resulting tuples to other processing elements. Generally, embodiments disclosed herein monitor the amount of memory used by a PE, operator, or group of PE and/or operators. In one embodiment, operators and/or PEs may be grouped together into groups. Examples of these groups may include multiple instances of an operator within a job or instance, or where a user has grouped a set of operators or PEs together. Embodiments disclosed herein monitor the memory usage of the groups of operators and/or PEs. As memory use grows, a group's memory use may approach a memory threshold (such as a specified amount of memory, or a percentage of memory). As memory use approaches the memory threshold, embodiments disclosed herein may signal, to an application so the application can take action to reduce memory usage. When the memory used by a group exceeds the memory threshold, embodiments disclosed herein may take steps to reduce the amount of memory used by the group.

For example, if operator $A_1$ and operator $A_2$ of operator group A, executing on a compute node, combined have a memory use that approach a memory use threshold, embodiments disclosed herein may signal to a streams application that the memory use of operator group A is approaching the memory use threshold. In addition, in some embodiments, when the memory use of operator group A reaches the memory use threshold, a streams manager may take steps to reduce the amount of memory used by the group. These steps may include managing the group's data structures.

Advantageously, embodiments described herein provide techniques for monitoring and limiting the amount of memory used at an operator group or PE group level in a stream computing environment. That is, rather than monitoring memory usage based on processes or at an application level, memory usage may be monitored at a group level across processing elements to better provide information about memory consumption used by a group in a stream computing application.

Note, the following references a distributed application of a streams processing environment as a reference example of an application executing in a cluster of computing nodes, where processing elements in each node perform some task that results in data being output to other processing elements. However, one of skill in the art will recognize that embodiments presented herein may be adapted to a variety of applications having components that store data in memory.

Figure 1:
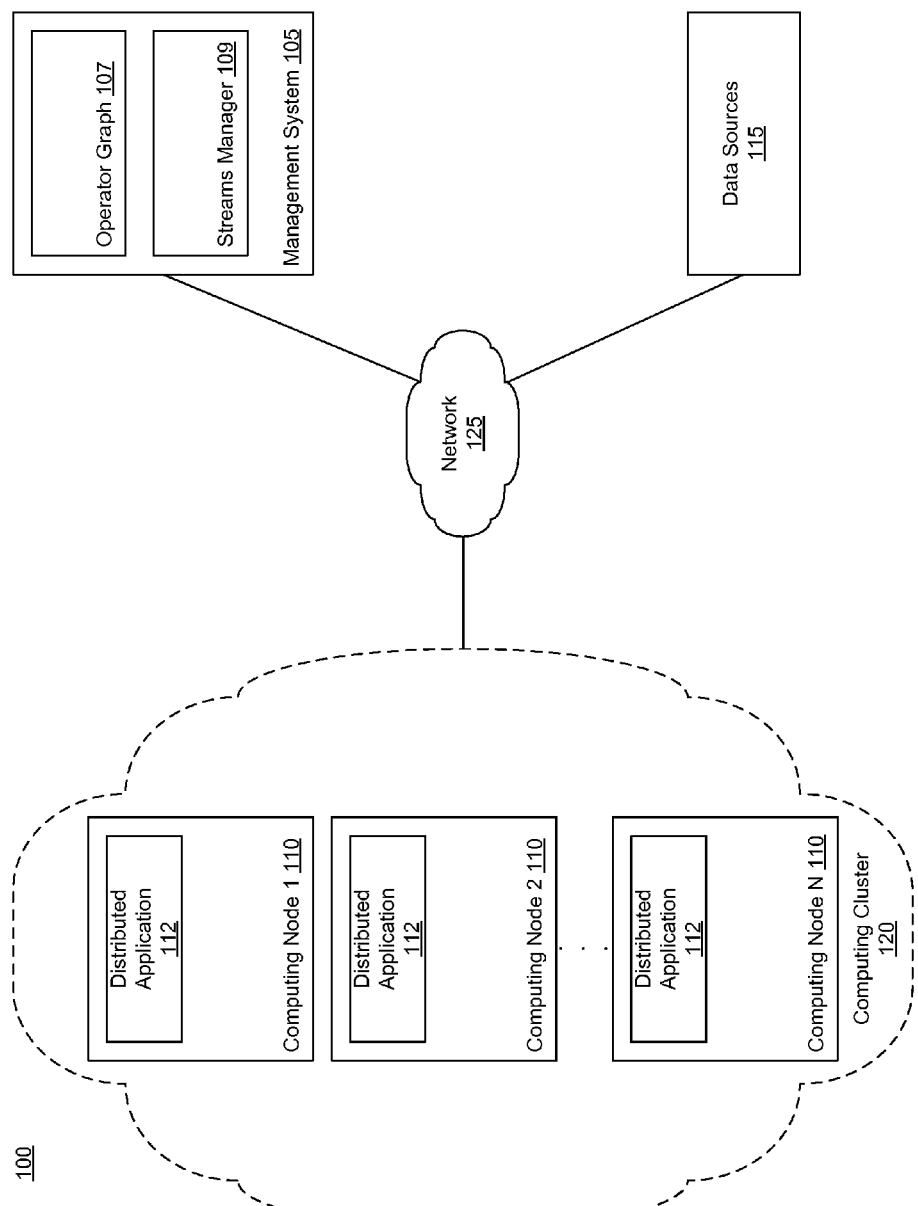
FIG. 1 illustrates an example computing environment, according to one embodiment.

FIG. 1 illustrates an example computing environment 100, according to one embodiment. As shown, computing environment 100 includes a computing cluster 120, a management system 105, and one or more data sources 115. The computing cluster 120, management system 105, and data sources 115 are each connected via a network 125, such as the internet, a local area network (LAN), or a computer bus.

In one embodiment, the computing cluster 120, which may include one or more computing nodes 110. Each computing node 110 may be a physical computing system, a virtual machine instance executing in a cloud computing environment, or a process running on a computer. The computing nodes 110 each execute a distributed application 112. The distributed application 112 may be the same for each computing node 110, or each computing node 110 may have a different portion of the distributed application 112. The distributed application 112 retrieves input streams of data from various data sources 115, e.g., over the network 125. Examples of such data include message data, XML documents, biometric data captured from an individual in real-time, etc. The distributed application 112 may utilize the computing nodes 110 to analyze the input streams in manageable data units called "tuples." A tuple is a list of values. Further, the distributed application 112 includes processing elements executing on various nodes that perform a specified task using tuples as input. Tuples flow from processing element to processing element in the streams processing environment.

In one embodiment, the computing environment 100 includes the management system 105, which may be a physical computing system, a virtual machine instance in a cloud environment, a process running on a computer, and/or as distributed components executing on the computing nodes. The management system 105 includes an operator graph 107 and a streams manager 109. As described in greater detail below, the operator graph 107 represents a stream computing application beginning from one or more operators in one or more source processing elements (PEs) through to one or more operators in one or more sink PEs. This flow from source to sink is also generally referred to herein as an execution path. Generally, data attributes flow into an operator of a source PE of a stream computing application and are processed by that operator. Operators may receive an N-tuple of data attributes from the stream as well as emit an N-tuple of data attributes into the stream. Other operators may terminate the stream, such as operators in a sink PE.

In general, a "tuple" is a single instance of a set of data attributes that follow the formatting of a schema, where the schema establishes a set of typed data attributes that may be used. For example, the tuple may be a chunk or portion of divisible data such as a data type (e.g., string, integer, Boolean, etc.) or combination of data types. In certain embodiments, a "tuple" may include one or more attributes with an assigned value—e.g., Tuple 1: {sym="Fe", no=26} where "sym" and "no" are possible attributes in the schema (i.e., a string and integer, respectively) and "Fe" and "26" are the values.

An N-tuple received by an operator need not be the same N-tuple sent downstream. Additionally, operators could be configured to receive or output tuples in other formats (e.g., the PEs or operators could exchange data marked up as XML documents). Further, each operator within a PE may be configured to carry out any form of data processing functions on the received tuple, including, for example, writing to database tables or performing other database operations such as data joins, splits, reads, etc., as well as performing other data analytic functions or operations.

The streams manager 109 may be configured to monitor and control a stream computing application running on the computing nodes 110, as well as to change the deployment of the operator graph 107. The streams manager 109 may monitor and manage the processing loads of the computing nodes 110 in the computing environment 100. Further, the streams manager 109 may monitor and manage memory use by processing elements and operators on the computing nodes 110. The streams manager 109 may aggregate the memory usage of a group of operators and determine the amount of memory used by the group of operators. If the group of operators uses memory at a level that approaches a memory threshold, the streams manager 109 may signal the distributed application 112 to reduce its memory usage. If the group of operators exceeds the memory threshold, the streams manager 109 may perform operations to reduce the memory usage.

As indicated above, each operator may perform a specified task associated with a data workload. An operator may receive a tuple, perform action on that tuple, and output another tuple. For example, one operator may receive a tuple that consists of comma-delineated text values. The operator may determine the number of times a given term appears in the tuple and send the result to another operator, in addition to other specified information.

Figure 2:
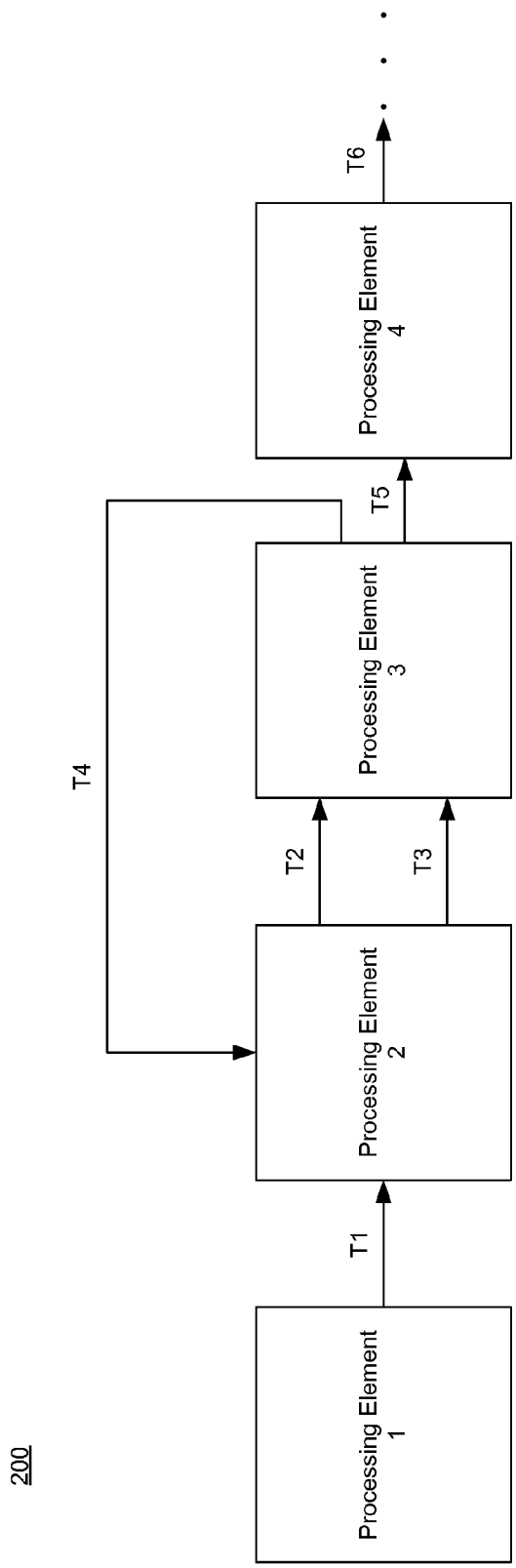
FIG. 2 example operator graph, according to one embodiment.

FIG. 2 illustrates an example operator graph 200, according to one embodiment. As stated, a developer can configure processing elements through an operator graph, allowing a developer to determine in which nodes to place each processing element, functions that each operator in the processing element performs, tuple destination processing elements, etc.

In this example, FIG. 2 illustrates four processing elements 1-4. Illustratively, each processing element outputs tuples (T1-T6) to other processing elements. For example, processing element 1 outputs a tuple T1 to processing element 2. Processing element 2 performs a specified function on the tuple T1 and outputs tuples T2 and T3 to processing element 3. Further, processing elements may output tuples to different destination processing elements. As illustrated, processing element 3 outputs tuple T4 to processing element 2 and tuple T5 to processing element 4.

Figure 3:
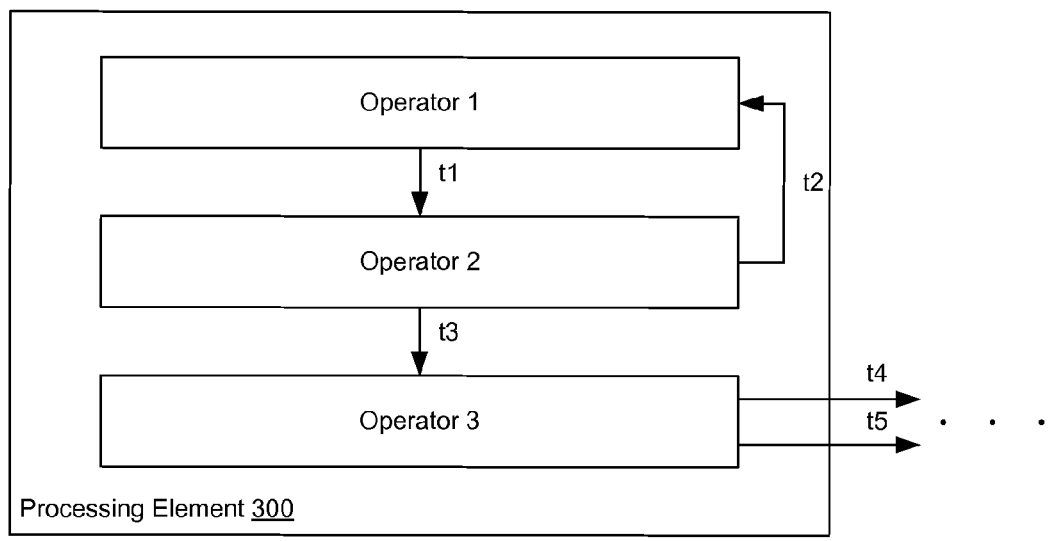
FIG. 3 illustrates an example processing element, according to one embodiment.

FIG. 3 illustrates an example processing element 300, according to one embodiment. As shown, the processing element 300 includes operators 1, 2, and 3. Illustratively, tuples t1-t5 flow from each operator to destination operators or to destination processing elements. Multiple tuples may also flow from a given operator or processing element. This flow from operators and PEs may be referred to as a stream.

The streams manager may coordinate the streams of data such that particular portions of the data, such as location data for a particular object from a set of objects, are sent to a particular operator, PEs, set of operators, or set of PEs for processing. This allows scaling of operators, PEs, and computing nodes based, in part, on the expected data set.

This scalability presents challenges to existing memory management systems. For example, it may be desirable to limit the amount of memory resources a particular set of operators or PEs may consume while processing in order to reserve memory resources for other operations. Existing memory management systems may allocate memory based on a 'fair share' of memory, or on a process by process basis. These techniques may not adequately address memory consumption where processes may scale based on the size of the data set. This is because limiting the memory usage on a per-process basis does not address memory usage issues arising from a large number of processes.

In some cases, it may be useful to aggregate and limit the memory consumption of multiple operators or PEs across processes collectively. The cross-process collective monitoring and management of memory resources may be performed based on groups of operators or processing elements. As noted above, the streams manager tracks and manages the memory usage, as well as the grouping of operators and PEs. The streams manager is then able to combine this information to track and manage the memory usage these groups. As the streams manger may operate across an entire computing cluster wherever managed operators and PEs are located, the streams manager may also track and manage memory usage across multiple computers for groups of operators and/or PEs.

Figure 4:
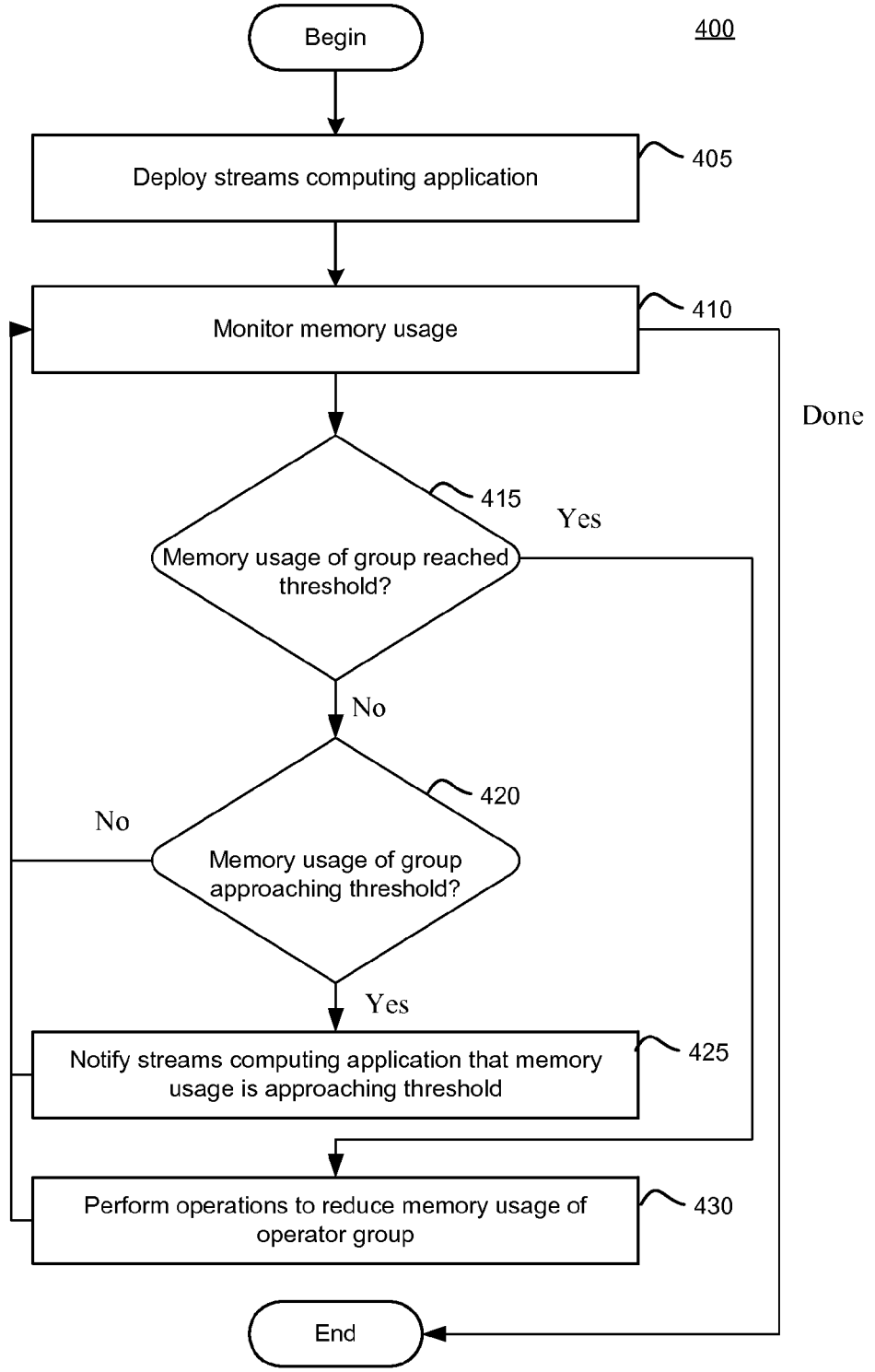
FIG. 4 is a flow diagram illustrating example operations for limiting memory in a distributed environment at a group level, according to one embodiment.

FIG. 4 is a flow diagram illustrating example operations 400 for limiting memory in a distributed environment at a group level, according to one embodiment. At step 405, the streams computing application is deployed to the computing cluster according to the operator graph. The streams manager tracks the deployment of, among other items, the PEs and operators deployed. The streams manager may also detect the total amount of system memory at each computing node as well as the amount of available memory. The streams manager may also monitor and manage the processing and memory loads of the computing nodes. At step 410, the streams manager monitors the memory usage of a group of operators or PEs. Step 410 is discussed in greater detail with reference to FIG. 7. At step 415, the memory usage of the group of operators or PEs is compared against a threshold memory value. Where the memory usage of the group has not yet reached the threshold, the streams manager may, at step 420, determine whether memory usage is approaching the threshold. Where the memory usage of the group is also not approaching the threshold, the streams manager continues to monitor the memory usage of the group. Where the memory usage of the group is approaching the threshold, the streams manager, at step 425, may notify the streams computing application that it is nearing the memory limit for a particular group of operators or PEs. The streams computing application may be coded to recognize such notifications and gracefully reduce the memory usage of the indicated group. Where the memory usage of the group has reached the threshold, at step 430, the streams manager may perform operations to reduce memory usage of the group. For example, the streams manager may simply kill processes when the threshold is reached. However, as the streams manager tracks and manages the execution of the streams on the PEs and operators, the streams manager may also be able to more gracefully perform memory management. For example, the streams manager may be able to access the data structures in memory used by the PEs and operators to store data and selectively prune the group data structure when the memory threshold is reached. This pruning may be based on a least recently used algorithm where the oldest data elements are removed first. The streams manager may also simply remove a set portion, for example one half, of the data elements. The streams manager may also prevent additional data to be placed into the data structure when approaching the threshold to prevent increases in memory use but still allow processing of structures already in memory. The management of the in-memory data structures may be performed when the threshold is reached or also at step 425 where the memory usage of the group is approaching the threshold. Memory management by the streams manager may be in addition to, or in place of, notifying the streams computing application. The streams manager stops monitoring memory usage when the streams computing application done executing.

Figure 5:
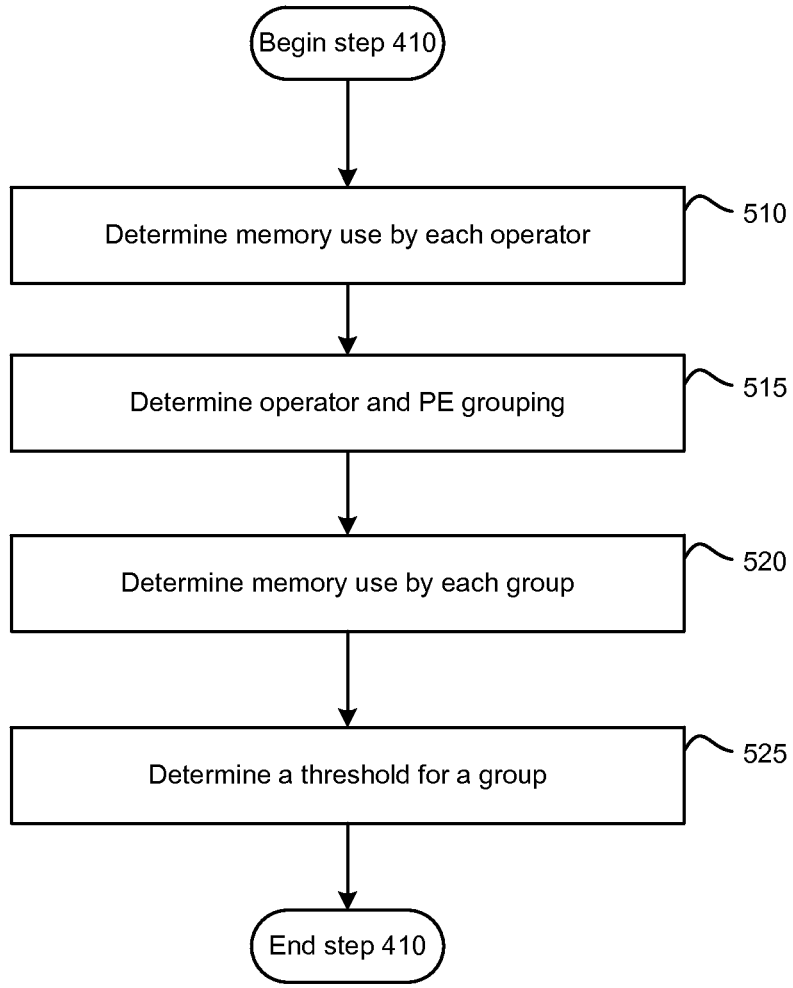
FIG. 5 is a flow diagram illustrating example operations for monitoring the memory usage of a group of operators or PEs, according to one embodiment.

FIG. 5 is a flow diagram illustrating example operations 500 for monitoring the memory usage of a group of operators or PEs, according to one embodiment. At step 510, the streams manager determines the memory usage by each operator. The streams manager monitors memory usage of the PEs on a processes and may be able to query the host operating system for the memory usage.

At step 515, the streams manager determines the grouping for each operator or PE. As discussed above, a PE may be composed of one or more operators fused together into an independently running process with its own process ID (PID) and memory space. In cases where two (or more) processing elements are running independently, inter-process communication may occur using a "transport" (e.g., a network socket, a TCP/IP socket, or shared memory). However, when operators are fused together, the fused operators can use more rapid communication techniques for passing tuples among operators in each processing element.

Operators and PEs may be grouped together for multiple purposes, including memory tracking and to form some sort of atomic grouping. For example, default "out of the box" groupings may be defined for fused operators, or multiple deployments of an operator with a job or instance. Other groupings may be performed on demand, such as where a user defines some sort of grouping, or where an operator performs a grouping operation, such as through a join operation, and so forth. The streams manager may then track and monitor the groups. As such, grouped operators and PEs are likely related. For example, an operator may be duplicated across multiple distributed applications or even across multiple computing nodes.

At step 520, the memory usage by each operator or PE group may be determined. The streams manager may aggregate the memory usage of each operator or PE in a group in order to determine a total memory usage by that group. The streams manager may then monitor memory usage for groups and compare the overall memory usage to a particular memory threshold. At step 525, a threshold memory usage for a group may be determined. For example, a default or user provided value may set an absolute limit to the amount of memory a group may use. The memory usage of operators or PEs may then be aggregated across the group and compared against the set limit. Where various computing nodes have different amounts of available memory or systems where additional nodes may be added, an absolute memory usage limit may be difficult to define or otherwise limiting.

Additional flexibility and scalability may be possible where the threshold is defined as a percentage. This percentage may be a percentage of the memory across a cluster of computers. For example, streams manager may determine the total amount of memory available to each computing node and then aggregate the amount to determine the total amount of memory available across the cluster. The streams manager may then then monitor the memory usage of each group as a percentage of the total amount of memory available across the cluster. The percentage may also be a percentage of memory for each computing node. The streams manager in such a case would determine and track the amount of memory available to each computing node and then compare, as a percentage, the amount of memory used by each group executing on the computing node to the amount of memory available.

Figure 6:
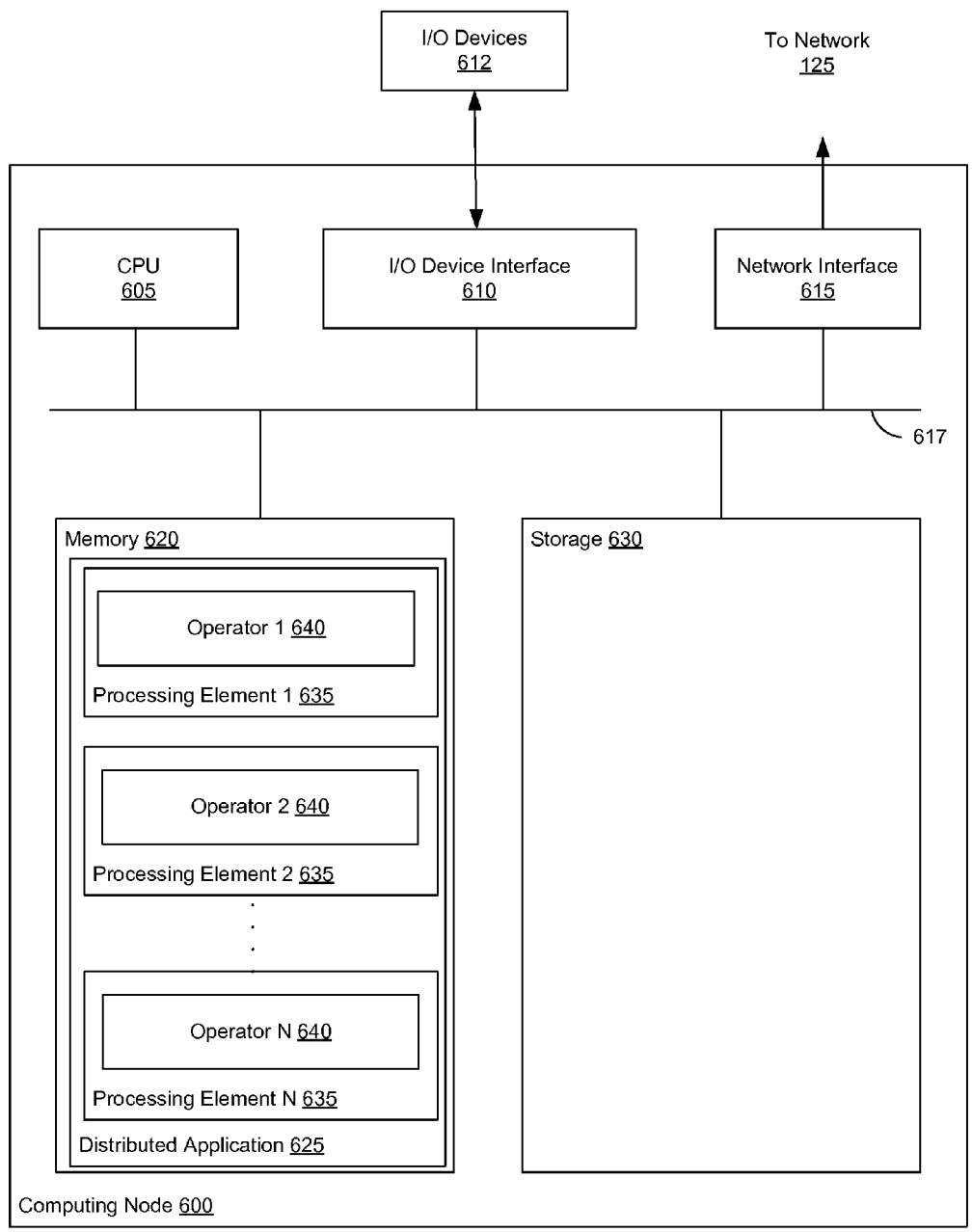
FIG. 6 illustrates the computing node of FIG. 1, according to one embodiment.

FIG. 6 illustrates the computing node 110 of FIG. 1, according to one embodiment. As shown, the computing node 600 includes one or more central processing units (CPU) 605 a network interface 615, an interconnect 617, a memory 620, and storage 630. The computing node 600 may also include an I/O devices interface 610 used to connect I/O devices 612 (e.g., keyboard, display and mouse devices) to the computing node 600.

Each CPU 605 retrieves and executes programming instructions and application stored in the memory 620. The interconnect 617 is used to transmit programming instructions and application data between each CPU 605, I/O devices interface 610, storage 630, network interface 615, and memory 620. CPU 605 is included to be representative of a single CPU, multiple CPUs, a single CPU having multiple processing cores, and the like. In one embodiment, a PE 635 is a process assigned to be executed by only one CPU 605 although in other embodiments the operators 640 of a PE 635 may be one or more processes that are executed on a plurality of CPUs 605. Each PE 635 may be multi-threaded and execute one or more operator threads on a plurality of CPUs 605. The memory 620 is generally included to be representative of a random access memory (e.g., DRAM or Flash). Storage 630, such as a hard disk drive, solid state device (SSD), or flash memory storage drive, may store non-volatile data as required.

In this example, the memory 620 includes a plurality of processing elements 635 (PE). Each PE 635 includes a collection of operators 640 that may be fused together. Each operator 640 may provide a segment of code configured to process data flowing into a processing element (e.g., PE 635) and to emit data to other operators 640 in the same PE or to other PEs in the stream computing application. Multiple PEs may also be configured with the same operators 640. Processing elements may be on the same computing node 600 or on other compute nodes that are accessible via communications network 125.

Figure 7:
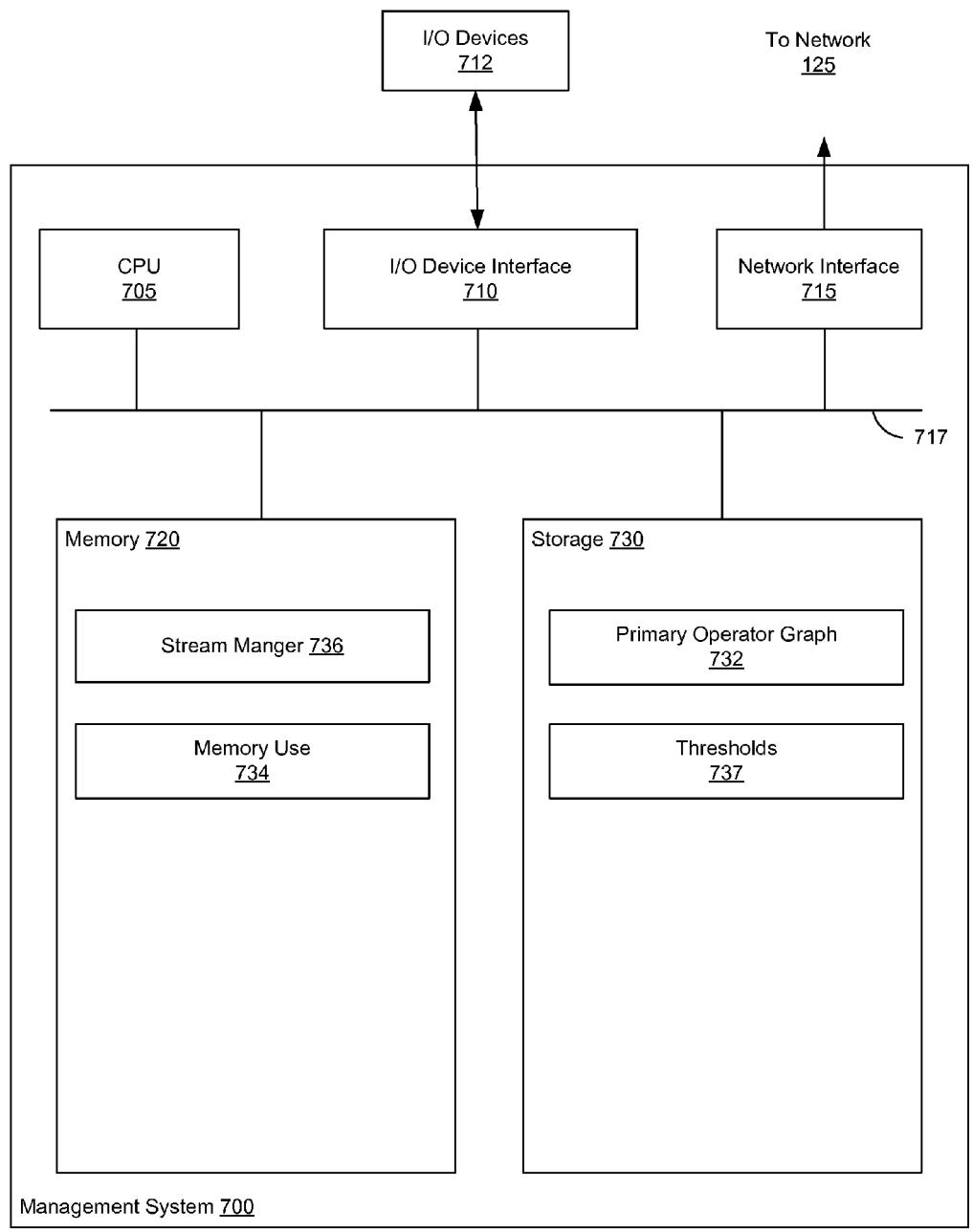
FIG. 7 illustrates the management system of FIG. 1, according to one embodiment.

FIG. 7 illustrates the management system 105 of FIG. 1, according to one embodiment. As shown, management system 700 includes, without limitation, a CPU 705, a network interface 715, an interconnect 717, a memory 720, and storage 730. The management system 700 may also include an I/O device interface 710 connecting I/O devices 712 (e.g., keyboard, display and mouse devices) to the management system 700.

The CPU 705 is configured to retrieve and execute programming instructions stored in the memory 720 and storage 730. Similarly, the CPU 705 is configured to store and retrieve application data residing in the memory 720 and storage 730. The interconnect 717 is configured to move data, such as programming instructions and application data, between the CPU 705, I/O devices interface 710, storage unit 730, network interface 715, and memory 720. The CPU 705 is included to be representative of a single CPU, multiple CPUs, a single CPU having multiple processing cores, and the like. Memory 720 is generally included to be representative of a random access memory. The network interface 715 is configured to transmit data via the communications network 125. Although shown as a single unit, the storage 730 may be a combination of fixed and/or removable storage devices, such as fixed disc drives, removable memory cards, optical storage, SSD or flash memory devices, network attached storage (NAS), or connections to storage area-network (SAN) devices.

As shown, the memory 720 stores a streams manager 736 and memory use 734. Additionally, the storage 730 includes a primary operator graph 732. The streams manager 736 may use the primary operator graph 732 to route tuples to PEs for processing. The memory use 734 comprises current memory use values for each of a plurality of operators. As shown, the storage 730 includes thresholds 737. The thresholds 737 stores memory usage thresholds for groups of operators. The thresholds 737 may be, for example, a percentage of available memory on a compute node, a percentage of available memory of the memory allocated to an operator, a fixed value (such as one gigabyte of memory), and the like. The thresholds 737 may be upper limits which, when exceeded, cause the streams manager 736 to perform operations to reduce memory usage. The thresholds 737 may be default thresholds and/or user-defined thresholds.

The streams manager 736 may also specify properties of the streams processing environment. For example, such properties may describe which node a given processing element is located, a specified flow of data between computing nodes, address information of each node, operators associated with the nodes, and the like.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., the IDE tool and debugger) or related data available in the cloud. For example, the IDE tool and debugger could execute on a computing system in the cloud and track counts of tuples being output by processing elements in the streams processing environment. In such a case, the debugger could break at instances where a processing element outputs an unexpected amount of tuples to a destination processing element and store a log of such instances at a storage location in the cloud. Doing so allows a developer to access this information from any computing system attached to a network connected to the cloud (e.g., the Internet).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A system for limiting memory consumption, the system comprising:
   one or more computer processors;
   a memory containing a program which when executed by the one or more computer processors performs an operation, the operation comprising:
      receiving a plurality of data elements for processing in a streams computing environment;
      managing, using a streams manager and an operator graph, a plurality of processing elements for processing the plurality of data elements, the plurality of processing elements executing across a plurality of compute nodes, each processing element comprising one or more operators, each operator configured to perform one or more operations on a data element of the plurality of data elements, wherein the operator graph represents an execution path for the operators such that at least one operator receives a data element from an upstream operator and transmits a data element to a downstream operator according to the operator graph;
      determining, using the streams manager, a group of executing processes for a distributed application in the streams computing environment, the distributed application comprising a subset of the plurality of processing elements, the group determined based on at least one of: (i) fused operators in the subset of the plurality of processing elements, (ii) multiple deployments of an operator in the subset of the plurality of processing elements, and (iii) a grouping operation performed by an operator in the subset of the plurality of processing elements;
      monitoring, via the streams manager for the distributed application, an amount of memory used by the group of executing processes, wherein a first executing process of the group of executing processes is executing on a first compute node of the plurality of compute nodes, wherein a second executing process of the group of executing processes is executing on a second compute node of the plurality of compute nodes, and wherein the first compute node is distinct from the second compute node;
      determining the amount of memory used by the group based, at least in part, on a determined amount of memory used by the first process in the first compute node and a determined amount of memory used by the second process in the second compute node;
      comparing the amount of memory used by the group against a first memory threshold; and
      determining whether the memory used by the group exceeds the first threshold, and reducing memory usage by the group when the memory used by the group exceeds the first threshold.

2. The system of claim 1, wherein the first threshold comprises a total amount of memory allocated for use by the group.

3. The system of claim 1, wherein the first threshold comprises a percentage of memory available across the stream computing environment.

4. The system of claim 1, wherein the group comprises one or more group data structures used to store data and wherein reducing memory usage comprises pruning data from the group data structures.

5. The system of claim 1, further comprising determining whether the memory used by the group exceeds a second threshold, the second threshold smaller than the first threshold, but has not yet exceeded the first threshold and further comprising taking steps to reduce memory usage by the group.

6. The system of claim 5, wherein the steps include notifying the distributed application that the group is approaching the first threshold.

7. The system of claim 1, wherein the first compute node comprises a first physical computing system and the second compute node comprises a second physical computing system, wherein the first executing process executes on the first physical computing system and the second executing process executes on the second physical computing system, wherein the first physical computing system is distinct from the second physical computing system.

8. The system of claim 7, wherein the first executing process is a duplicate of the second executing process.

9. The system of claim 1, wherein the first threshold comprises a percentage of memory available in the compute nodes on which the processes of the group are executing.

10. The system of claim 1, wherein the group comprises one or more group data structures used to store data and wherein reducing memory usage comprises preventing additional data from being added to the group data structures.

11. A computer program product comprising:
a computer readable storage medium having computer-readable program code embodied therewith, the computer-readable program code for limiting memory consumption, comprising:
computer-readable program code configured to receive a plurality of data elements for processing in a streams computing environment;
computer-readable program code configured to manage, using a streams manager and an operator graph, a plurality of processing elements for processing the plurality of data elements, the plurality of processing elements executing across a plurality of compute nodes, each processing element comprising one or more operators, each operator configured to perform one or more operations on a data element of the plurality of data elements, wherein the operator graph represents an execution path for the operators such that at least one operator receives a data element from an upstream operator and transmits a data element to a downstream operator according to the operator graph;
computer-readable program code configured to determine, using the streams manager, a group of executing processes for a distributed application in the streams computing environment, the distributed application comprising a subset of the plurality of processing elements, the group determined based on at least one of: (i) fused operators in the subset of the plurality of processing elements, (ii) multiple deployments of an operator in the subset of the plurality of processing elements, and (iii) a grouping operation performed by an operator in the subset of the plurality of processing elements;
computer-readable program code configured to monitor, via the streams manager for the distributed application, an amount of memory used by the group of executing processes, wherein a first executing process of the group of executing processes is executing on a first compute node of the plurality of compute nodes, wherein a second executing process of the group of executing processes is executing on a second compute node of the plurality of compute nodes, and wherein the first compute node is distinct from the second compute node;
computer-readable program code configured to determine the amount of memory used by the group based, at least in part, on a determined amount of memory used by the first process in the first compute node and a determined amount of memory used by the second process in the second compute node;
computer-readable program code configured to compare the amount of memory used by the group against a first memory threshold; and
computer-readable program code configured to determine whether the memory used by the group exceeds the first threshold, and reducing memory usage by the group when the memory used by the group exceeds the first threshold.

12. The computer-program product of claim 11, wherein the first threshold comprises a total amount of memory allocated for use by the group.

13. The computer-program product of claim 11, wherein the first threshold comprises a percentage of memory available across the stream computing environment.

14. The computer-program product of claim 11, wherein the group comprises one or more group data structures used to store data and wherein reducing memory usage comprises pruning data from the group data structures.

15. The computer-program product of claim 11, further comprising determining whether the memory used by the group exceeds a second threshold, the second threshold smaller than the first threshold, but has not yet exceeded the first threshold and further comprising taking steps to reduce memory usage by the group.

16. The computer-program product of claim 11, wherein the first compute node comprises a first physical computing system and the second compute node comprises a second physical computing system, wherein the first executing process executes on the first physical computing system and the second executing process executes on the second physical computing system, wherein the first physical computing system is distinct from the second physical computing system.

17. The computer-program product of claim 16, wherein the first executing process is a duplicate of the second executing process.

18. The computer-program product of claim 11, wherein the first threshold comprises a percentage of memory available in the compute nodes on which the processes of the group are executing.

19. The computer-program product of claim 11, wherein the group comprises one or more group data structures used to store data and wherein reducing memory usage comprises preventing additional data from being added to the group data structures.

* * * * *